US011870822B2

(12) United States Patent
Forsyth et al.

(10) Patent No.: US 11,870,822 B2
(45) Date of Patent: *Jan. 9, 2024

(54) PROCESSING SENSITIVE INFORMATION OVER VOIP

(71) Applicant: PCI-Pal (U.K.) Limited, Ipswich (GB)

(72) Inventors: Geoff Forsyth, Ipswich (GB); Cesar Branco, Ipswich (GB); James Thorpe, Ipswich (GB)

(73) Assignee: PCI-Pal (U.K.) Limited, Ipswich (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,500

(22) Filed: Apr. 11, 2022

(65) Prior Publication Data

US 2022/0239705 A1 Jul. 28, 2022

Related U.S. Application Data

(63) Continuation of application No. 17/698,468, filed on Mar. 18, 2022, and a continuation of application No.
(Continued)

(30) Foreign Application Priority Data

Oct. 11, 2017 (GB) ..................................... 1716649

(51) Int. Cl.
*H04L 65/1069* (2022.01)
*H04L 65/1046* (2022.01)
(Continued)

(52) U.S. Cl.
CPC ...... *H04L 65/1069* (2013.01); *H04L 65/1046* (2013.01); *H04L 65/1104* (2022.05);
(Continued)

(58) Field of Classification Search
CPC ............. H04L 65/1069; H04L 65/1006; H04L 65/1046; H04L 65/605; H04M 7/0066; H04M 3/5166; H04M 3/5141
See application file for complete search history.

(56) References Cited

U.S. PATENT DOCUMENTS 5,903,877 A  5/1999  Berkowitz et al.
5,937,051 A  8/1999  Hurd et al.
(Continued)

FOREIGN PATENT DOCUMENTS

GB  2496850 A  5/2013
GB  2548413 A  9/2017
(Continued)

OTHER PUBLICATIONS

EPO Communication dated Feb. 11, 2021 concerning US 2017/0026516 (D1) previously submitted.
(Continued)

*Primary Examiner* — Nam T Tran
(74) *Attorney, Agent, or Firm* — BURR & FORMAN LLP

(57) ABSTRACT

This invention relates to a method of processing sensitive information over VoIP. The method provides a method of processing, by a call processor, a media call comprising the steps of: receiving a first signalling stream from a first entity; creating a second signalling stream to a second entity; forwarding signals received from the first signalling stream to the second signalling stream; receiving a third signalling stream from the second entity; creating a fourth signalling stream to the first entity; and forwarding signals received on the third signalling stream to the fourth signalling stream; the first signalling stream containing instructions to set up a media call between the first entity and the second entity such that media is transmitted over a first media stream from the first entity to the second entity and a media is transmitted
(Continued)

over a second media stream from the second entity to the first entity without intervention by said call processor.

20 Claims, 5 Drawing Sheets

Related U.S. Application Data

16/754,806, filed as application No. PCT/GB2018/052880 on Oct. 9, 2018, now Pat. No. 11,310,291.

(51) Int. Cl.
*H04M 7/00* (2006.01)
*H04L 65/75* (2022.01)
*H04L 65/1104* (2022.01)
*H04L 65/65* (2022.01)

(52) U.S. Cl.
CPC ........ *H04L 65/765* (2022.05); *H04M 7/0066* (2013.01); *H04L 65/65* (2022.05)

(56) References Cited

U.S. PATENT DOCUMENTS

| | | | |
|---|---|---|---|
| 6,327,359 B1 | 12/2001 | Kang et al. | |
| 6,862,343 B1 | 3/2005 | Vacek et al. | |
| 6,959,078 B1 | 10/2005 | Eilbacher et al. | |
| 7,113,580 B1 | 9/2006 | DellaMorte, Sr. et al. | |
| 7,287,223 B2 | 10/2007 | Smoliar et al. | |
| 7,522,720 B2 | 4/2009 | Drobek | |
| 7,529,362 B1 | 5/2009 | Steinbeck et al. | |
| 7,881,294 B1 | 2/2011 | Croak et al. | |
| 8,606,604 B1 | 12/2013 | Huber et al. | |
| 8,750,471 B2 | 6/2014 | Tew et al. | |
| 8,831,204 B1* | 9/2014 | Pycko | H04M 3/5166 379/283 |
| 8,976,953 B2* | 3/2015 | Peterson | H04M 3/5141 379/265.09 |
| 9,100,484 B1* | 8/2015 | Kleck | H04M 3/5183 |
| 9,858,573 B2 | 1/2018 | Tew et al. | |
| 10,402,826 B2 | 9/2019 | Tew et al. | |
| 10,529,336 B1* | 1/2020 | Matthews | H04M 3/42221 |
| 10,909,263 B2* | 2/2021 | Ogle | G06F 21/42 |
| 11,049,108 B2 | 6/2021 | Tew et al. | |
| 2001/0021248 A1 | 9/2001 | Utsumi | |
| 2001/0044787 A1 | 11/2001 | Shwartz et al. | |
| 2003/0084339 A1 | 5/2003 | Roginsky et al. | |
| 2003/0130893 A1 | 7/2003 | Farmer | |
| 2004/0111739 A1 | 6/2004 | Winegard | |
| 2004/0173674 A1 | 9/2004 | Matsuura | |
| 2004/0193897 A1 | 9/2004 | Van Volkenburgh | |
| 2005/0058120 A1 | 3/2005 | Lam et al. | |
| 2005/0246242 A1 | 11/2005 | Proctor | |
| 2006/0050658 A1 | 3/2006 | Shaffer et al. | |
| 2006/0074897 A1 | 4/2006 | Fergusson | |
| 2006/0251238 A1 | 11/2006 | Richartz et al. | |
| 2007/0036331 A1 | 2/2007 | Fitzgerald | |
| 2007/0127696 A1 | 6/2007 | White | |
| 2008/0011823 A1 | 1/2008 | Patel et al. | |
| 2008/0022091 A1 | 1/2008 | Deshpande et al. | |
| 2008/0056464 A1 | 3/2008 | Kalahasti et al. | |
| 2008/0065902 A1 | 3/2008 | Spohrer et al. | |
| 2008/0208579 A1 | 8/2008 | Weiss et al. | |
| 2008/0235038 A1 | 9/2008 | Szamel | |
| 2008/0240404 A1 | 10/2008 | Conway et al. | |
| 2008/0256613 A1 | 10/2008 | Grover | |
| 2009/0067610 A1 | 3/2009 | Bogros et al. | |
| 2009/0089181 A1 | 4/2009 | Mathis, Jr. | |
| 2012/0027195 A1* | 2/2012 | Shaffer | H04M 3/42221 379/265.09 |
| 2013/0136242 A1 | 5/2013 | Ross et al. | |
| 2017/0026516 A1* | 1/2017 | Westlake | H04M 3/5183 |

FOREIGN PATENT DOCUMENTS

| | | |
|---|---|---|
| JP | 2007004694 | 1/2007 |
| JP | 2007-249770 | 9/2007 |
| WO | 2006124945 | 11/2006 |
| WO | 200802587 | 1/2008 |
| WO | 2008073057 | 6/2008 |
| WO | 2008076776 | 6/2008 |
| WO | 2009136163 | 11/2009 |

OTHER PUBLICATIONS

"TouchNet Payment Gateway", TouchNet Information Systems, Inc., Administrator's Guide, Feb. 2004. 124 pages.
Jones, D., "LiveOps Announces the Availability of its Spring 08 On-Demand Call Center Platform", Product News Network (PNN), Feb. 2008, 2 pages.
Dehaan, P., "Redundancy Solutions Maximize Call Centers Uptime", Connections Magazine, Jun. 2007, 3 pages.
"Dialogic Audio Conferencing API: Demo Guide", Dialogic Corporation, Apr. 2008, 26 pages.
"Designing a DTMF Clamping Application", Case Study: Globestar Systems, Pika Technologies Inc., 2005, 3 pages.
Schelmetic, T., "LiveOps Develops Secure Exchange", Customer Interaction Solutions, Feb. 2007, 1 page.
Jones, D., "LiveOps Announces General Availability of Secure Exchange", Electronic News Publishing, Jan. 2007, 2 pages.
Sullivan, D., "Ultra Communications Publishes PCI Item in Call Centre Europe", Ultra Communications, Jan. 2008, 1 page.
"Voice recognition: what biometrics can do for your call centre", callcentrehelper.com, Oct. 2006, 4 pages.
Markowitz, J., "Voice Biometrics", Communications of the ACN, Sep. 2000, pp. 66-73.
"Financial transaction card originated messages—Interchange message specifications", International Standard Organization, Dec. 1993, 128 pages.
"Card Acceptor to Acquirer Interface Standards", APACS (Administration) Limited, Standard 70—Book 1, Jun. 2007, 148 pages.

* cited by examiner

PROCESSING SENSITIVE INFORMATION OVER VOIP

The present application is a continuation of U.S. application Ser. No. 17/698,468 filed Mar. 18, 2022 and a continuation of U.S. application Ser. No. 16/754,806, filed Apr. 9, 2020, which is a National phase of PCT/GB2018/052880 filed Oct. 9, 2018, which claims priority to Patent Application No. GB 1716649.7, filed Oct. 11, 2017, each of which is incorporated by reference herein in its entirety.

BACKGROUND a. Field of the Invention

Contact centres are extensively used by service providers for delivering services to, and communicating with, customers. Contact centres typically comprise a large group of agents taking or making telephone calls with customers. Contact centres often use call recording technologies, where an audio recording of the customer conversation is stored, and/or screen recording technologies, where a video or static snapshot of the agent's computer terminal is stored in order to aid in staff training, customer complaint management, compliance monitoring or record-keeping.

In many contact centre transactions the customer is either required to confirm his identity by providing the answer to security-based questions, or to provide his payment card details to pay for a transaction. The nature of much of this information is highly sensitive. In particular, the information can include passwords, personally-identifiable information such as a date of birth, a PIN, a memorable phrase, bank account numbers, credit card security codes and the like.

Data and identity theft, as well as fraudulent financial transactions, are widespread, and so it is of particular interest to the caller to keep secret as much of the information as possible. Disclosing personally-sensitive financial or other security information to a contact centre agent has the potential to increase personal data loss in a number of ways. For example, the contact centre agent can write down or memorise the customer's information for later use. It has even been known for agent's to make their own personal recordings of the information using their personal mobile phones or devices.

Furthermore, where audio or video recordings or screen shots are recorded, such data is vulnerable to fraudulent access.

The Payment Card Industry ("PCI") has developed a Data Security Standard (DSS) for businesses that store, process and/or transmit credit card data. Compliance with the PCI security standards is not optional for such businesses. The DSS dictates the methods and ways in which companies processing credit card data (including telephone-based credit card transactions) can store card and personal data. Regulations and guidelines such as these have a direct impact on contact centre which take customers' sensitive data in telephone conversations.

Secure telephony payment systems have been developed which can be used in order to allow potentially sensitive information such as payment card information to be transmitted directly to a payment processing system whilst preventing such information being transmitted in any form to the contact centres agent or contact centre agent terminal. In general a call is routed via the secure system and the system uses one of a number of various techniques such as suppression of Dual Tone Multi Frequency (DTMF) tones or muting the caller's voice stream in order to prevent potentially sensitive data from reaching the contact centre.

Contact centres have complex telephony systems optimised to provide bulk routing of calls at minimum cost. The majority of calls into the contact centre may not typically contain sensitive information, but it is important for the contact centre to be able to handle sensitive information securely should the need arise during any call handled by the contact centre staff. It is therefore desirable, but more expensive, to route all calls through the secure telephony system prior to entry into the contact centre. As the proportion of an individual call actually containing the sensitive information is small compared to the total length of the call it is not desirable or cost effective to use the secure telephony payment system for the entire duration of the call.

Ideally the secure telephony payment system would only be utilised for the relatively short period of time whilst secure information is being relayed to the payment processing system, but would be available for use by other transactions once the part of the call requiring transmission of secure information is complete.

However, it is problematic to switch a secure telephony payment system in and out of the call path once the call has been received by an agent in the contact centre. The process typically involves terminating the call and the contact centre agent calling back the original caller on a secure line. Alternative methods, such as creating a conference call with the secure payment system are ineffective as the sensitive data will still be detectable within the contact centre telephony system and therefore the advantage of removing the sensitive data from the contact centre is lost. Processes to place the caller 'on hold' within the public telephony system (i.e. external to the contact centre) whilst the contact centre agent is disconnected and reconnected via the secure payment system are also typically problematic as, for efficiency, in most contact centre systems when a call is terminated the agent handling the call generally becomes free again and available for subsequent calls. Hence the agent handling the initial call might not be available once the call returns to the centre via the secure payment system.

Historically calls have been routed using circuit switched connections in the public switched telephone network (PSTN). A caller would call the contact centre via the PSTN and the call centre private branch exchange (PBX) and the Automatic Call Distribution (ACD) system would connect the caller to an agent. All signalling was transmitted over the voice channel and the signalling and voice were very much bound together.

However, with the advent of Voice over Internet Protocol (VoIP) technologies signalling and voice are generally transmitted using different protocols from one another. VoIP isn't a protocol itself. Rather, VoIP is an umbrella term for a set of protocols involved in transporting voice information using IP. VoIP protocols include Session initiation Protocol (SIP), Media Gateway Control Protocol (MGCP) and H.323, for example. Whilst VoIP protocols are not yet standardised, SIP appears to be emerging as a popular choice. For secure transmissions of SIP messages over insecure network links, the protocol may be encrypted with Transport Layer Security (TLS).

SIP doesn't encode audio information in a phone call, nor does it transport audio information. SIP simply initiates and terminates communications sessions, for example the session may be a voice call between two people or a video conference between a whole team.

The job of SIP is to set up a call, conference or other interactive communication session and terminate it when it's over. This is achieved by sending messages between endpoints known as "SIP addresses." SIP doesn't do much during the session itself as its primary purpose is to establish the session and then end it. Therefore, the bandwidth of a SIP signalling stream is relatively small, for example, approximately 5 Kbps.

The session media (for example speech/voice or image data/video) is transmitted via a separate media stream. SIP can be used in conjunction with various protocols that specify and carry the session media. Media type and parameter negotiation and media setup is performed using Session Description Protocol (SDP), which is carried as payload in SIP messages.

Before voice can be sent over IP, it is encoded using a voice codec to convert audio signals into data.

The encoded packets of audio data are usually sent using Real-time Transport Protocol (RTP) or Secure Real-time Transport Protocol (SRTP), specialised application-layer protocols for transporting audio and video data when real-time streaming is necessary.

Signalling or media stream packets are themselves transmitted using transport layer protocols such as Transmission Control Protocol (TCP) or User Datagram Protocol (UDP). TCP is a protocol designed to transmit packets in an ordered sequence and to retransmit any packets that are lost along the way. Packet headers specify the order of each packet in the sequence. If packets are received out of order, they can be reordered at the receiving end. UDP is a protocol designed to transmit data without retransmission of lost packets or detection of out-of-sequence packets.

UDP is better than TCP for voice streams. Lost and out-of-sequence packets can cause audio quality issues, but usually these aren't detectable by the human ear. The amount of delay caused by the re-ordering and retransmission of TCP packets can ultimately result in much worse audio quality problems. SIP signalling streams on the other hand are usually transmitted using TCP.

Two of the most common codec standards are G.711 for uncompressed digital voice and G.729 codec for compressed voice. The bandwidth of the media stream is relatively large compared to that of the signalling stream, for example the bandwidth of an uncompressed voice stream is likely to be 100 Kbps. Compression degrades audio quality in order to reduce the amount of data transmitted in order to reduced the amount of bandwidth consumed by the call. However, compression usually corrupts Dual Tone Multi-Frequency (DTMF) tones which have been sent over the voice stream.

Historically this problem has been overcome by using 'out of band' DTMF whereby DTMF tones are detected and sent using an uncompressed voice stream. Alternatively the DTMF data may be sent as separate packets in the RTP stream. More recently the data represented by the detected DTMF tone is sent over a SIP signalling stream associated with the voice stream.

b. Related Art

In United Kingdom patent application number 1604668.2 a secure data collection system is described which uses an on demand appliance (ODA) in the contact centre to place a call out to a secure data collection system whilst sensitive data is transmitted. The secure data collection system prevents the sensitive data from reaching the agent. However, the sensitive data is routed through the ODA, which is located in the contact centre, to the secure data collection system. Whilst any security risk may be mitigated by physical security measures to prevent access to the ODA it is undesirable for the sensitive data to ever pass through the contact centre.

The separation of the signalling stream from the voice stream allows for a novel and inventive solution to the problem of processing sensitive information over VoIP.

SUMMARY OF THE INVENTION

According to the invention there is provided a method of processing, by a call processor, a media call comprising the steps of: receiving a first signalling stream from a first entity; creating a second signalling stream to a second entity; forwarding signals received from the first signalling stream to the second signalling stream; receiving a third signalling stream from the second entity; creating a fourth signalling stream to the first entity; and forwarding signals received on the third signalling stream to the fourth signalling stream; the first signalling stream containing instructions to set up a media call between the first entity and the second entity such that media is transmitted over a first media stream from the first entity to the second entity and a media is transmitted over a second media stream from the second entity to the first entity without intervention by said call processor.

Preferably the media streams are redirected via the call processor, upon receipt, by the call processor, of a message from the second entity the method further comprising the steps of: the call processor sending a message to the first entity to cause media to be transmitted over a third media stream to the call processor, the call processor creating a fourth media stream and forwarding media received from the first entity via the third media stream to the second entity over the fourth media stream such that the call processor may modify the media received from the first entity before forwarding the media to the second entity; and the call processor sending a message to the second entity to cause to cause media to be transmitted over a fifth media stream to the call processor, the call processor creating a sixth media stream and forwarding media received from the second entity via the fifth media stream to the first entity over the sixth media stream such that the call processor may modify the media received from the second entity before forwarding the media to the first entity.

In one embodiment the call processor modifies the media received from the first entity by removing sensitive information before forwarding the media stream to the second entity.

In another embodiment the call processor modifies the media received from the first entity by removing DTMF tones before forwarding the media stream to the second entity.

In a third embodiment the call processor modifies the media received from the first entity by removing spoken sensitive information before forwarding the media stream to the second entity.

Preferably the method further comprises the steps of: the contact centre sending a message to a secure data collection centre to indicate secure data collection is to be initiated on a particular media call; the secure data collection centre returning a personal identification number; and in which the message received by the call processor from the second entity contains said personal identification number.

Advantageously the media streams are reconnected to bypass the call processor, the method further comprising the steps of the call processor sending a message to the first entity to cause the media to be sent over the first media steam to the second entity; and the call processor sending a message to the second entity to cause media to be sent over the second media stream to the first entity.

The first entity may be a user and the second entity may be a contact centre.

The media call may be a VoIP call. The signalling streams may be SIP streams. The media stream may be an RTP stream.

DETAILED DESCRIPTION

Figure 1:
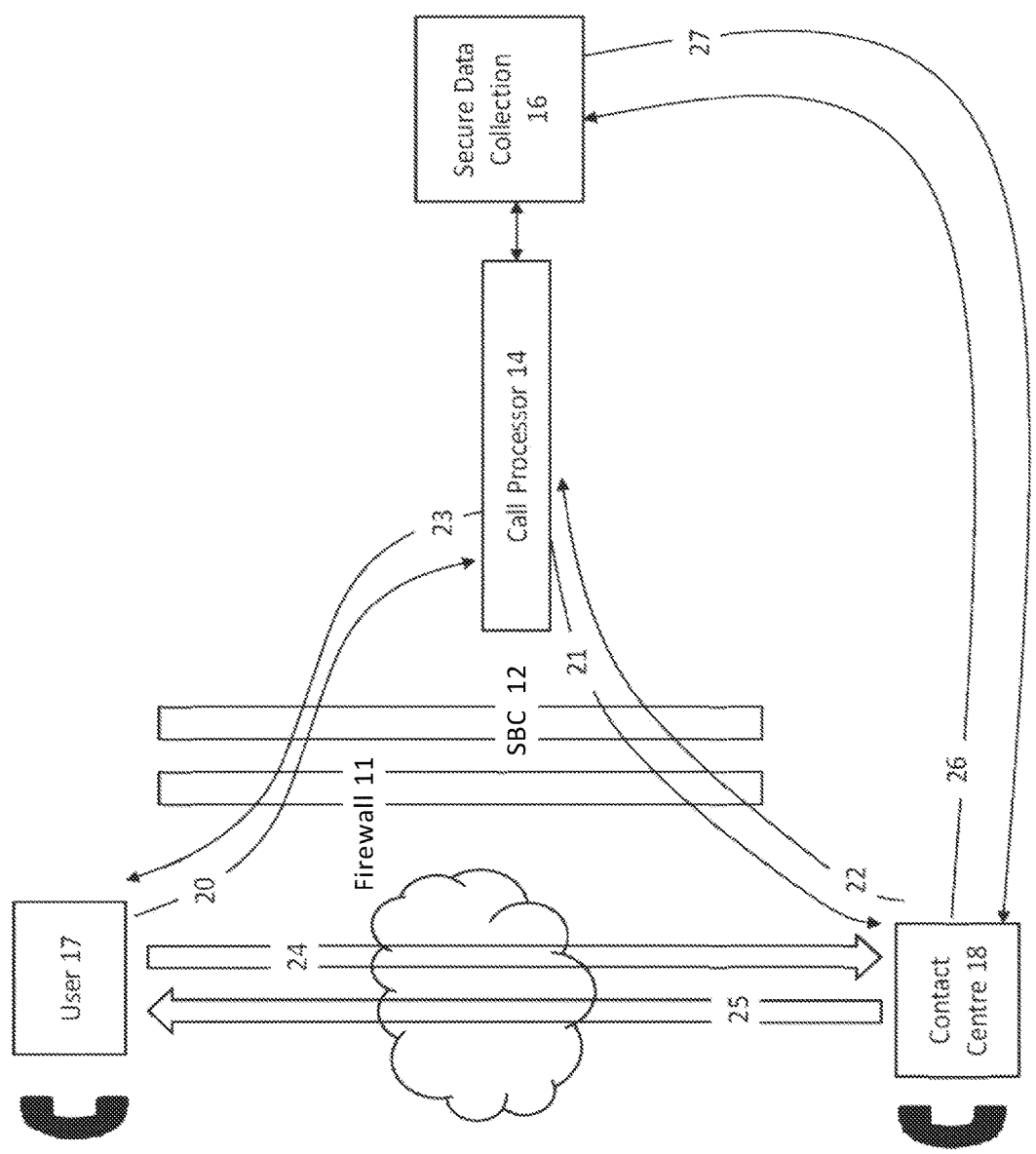
FIG. 1 is an illustration of a call processing environment for use in a system for collection of sensitive information.

Referring to FIG. 1, a call processor 14 is accessed via a firewall 11 (eg AWS), and a Session Border Controller 12 (SBC) (eg AudioCodes or Sonus). The call processor 14 interfaces with a secure data collection environment 16.

A first entity, in the embodiment described here, a user 17 initiates a VoIP call to a second entity, in the embodiment described here, a contact centre 18. The VoIP call may originate from the PSTN via a trunk provider. When the contact centre's address is detected in the signalling stream (for example, when during call set up using a SIP INVITE message) the trunk provider redirects the signalling stream to the call processor 14.

When call processor 14 receives a first signalling stream 20 from a user 17 the call processor 14 creates a second signalling stream 21 to the contact centre 18 and forwards any messages received via the first signalling stream 20 from the user to the contact centre 18 via the second signalling stream 21. Reciprocally the call processor 14 forwards any messages received via a third signalling stream 22 from the contact centre to the user 17 via a fourth signalling stream 23. The user is unaware that the signalling messages are intercepted and passed on by the call processor 14. Hence once signalling messages are exchanged to set up a VoIP call between the user 17 and the contact centre 18 the VoIP call is created between the user 17 and the contact centre 18 without intervention by the call processor 14. Hence, the bandwidth of the data that the call processor 14 needs to process is approximately 5 Kbps×2. As the call processor 14 retains signalling paths to both the user and to the contact centre the call processor 14 has the ability to control the interaction between the user 17 and the contact centre 18.

In more detail, using SIP protocol the call set up process may be as follows:
 1) SIP INVITE (first call ID) is sent by the user 17 to the call processor 14.
 2) SIP INVITE (second call ID) is sent by the call processor 14 to the contact centre 18.
 3) SIP OK (second call ID) is sent by the contact centre 18 to the call processor 14.
 4) SIP OK (first call ID) is sent by the call processor 14 to the user 17.
 5) A first voice media stream 24 (usually using RTP) is created from the user 17 to the contact centre 18.
 6) A second voice media stream 25 (usually using RTP) is created from the contact centre 18 to the user 17.

Figure 2:
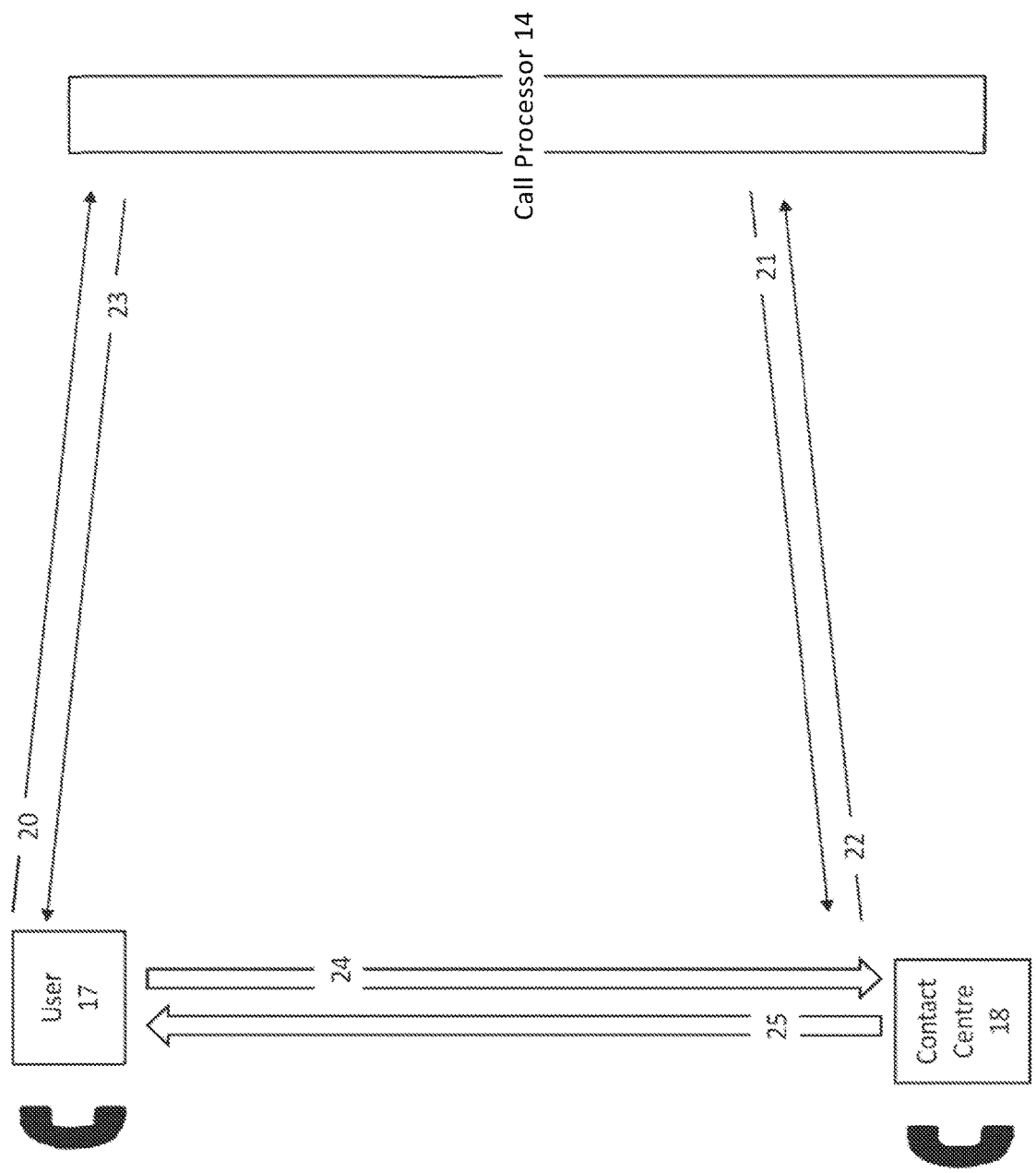
FIG. 2 is a simplified illustration of call paths when a call is in unsecured mode.

FIG. 2 is a simplified illustration showing the signalling and media streams when the call is in an 'unsecured' mode ie when it is not required to transmit sensitive information between the user 14 and the contact centre 17.

When it becomes necessary to transmit sensitive information between the user 17 and the contact centre 18 a request 26, which may be initiated by an agent in the call centre, is sent to the secure data collection server 16. The request 16 may be sent via the internet, via a private network or any other suitable means. The request from the contact centre 18 contains a unique identifier (sometimes called a SessionID) that identifies the contact centre agent within the contact centre. The unique identifier may be created (for example) when the contact centre agent logs onto the web interface of the Secure Data Collection 16 system.

The Secure Data Collection 16 system generates a Personal Identification Number (PIN) that is sends back to the contact centre agent over the Internet (typically displaying in a web browser).

The secure data collection server 16 returns a response 27 containing a unique identifier identifying the signalling streams and the media call in question.

The contact centre agent enters the PIN and generates a message requesting that a media call goes into 'secure mode' which is sent via signalling stream 22 to the call processor 14. This message contains the PIN. Call processor 14 liaises with the secure data collection server 16 to confirm that the request is legitimate, for example by comparing the PIN received to those which have been previously been sent out.

Assuming the request is legitimate call processor 14 reroutes the media stream so that it is redirected via the call processor.

In more detail, using SIP protocol the call rerouting process may be as follows:
 1) re-INVITE (first call ID) is sent by the call processor 14 to the user 17
 2) SIP OK (first call ID) is sent by the user to the call processor 14
 3) re-INVITE (second call ID) is sent by the call processor 14 to the contact centre 18
 4) SIP OK (second call ID) is sent by the contact centre 18 to the call processor 14.

Figure 3:
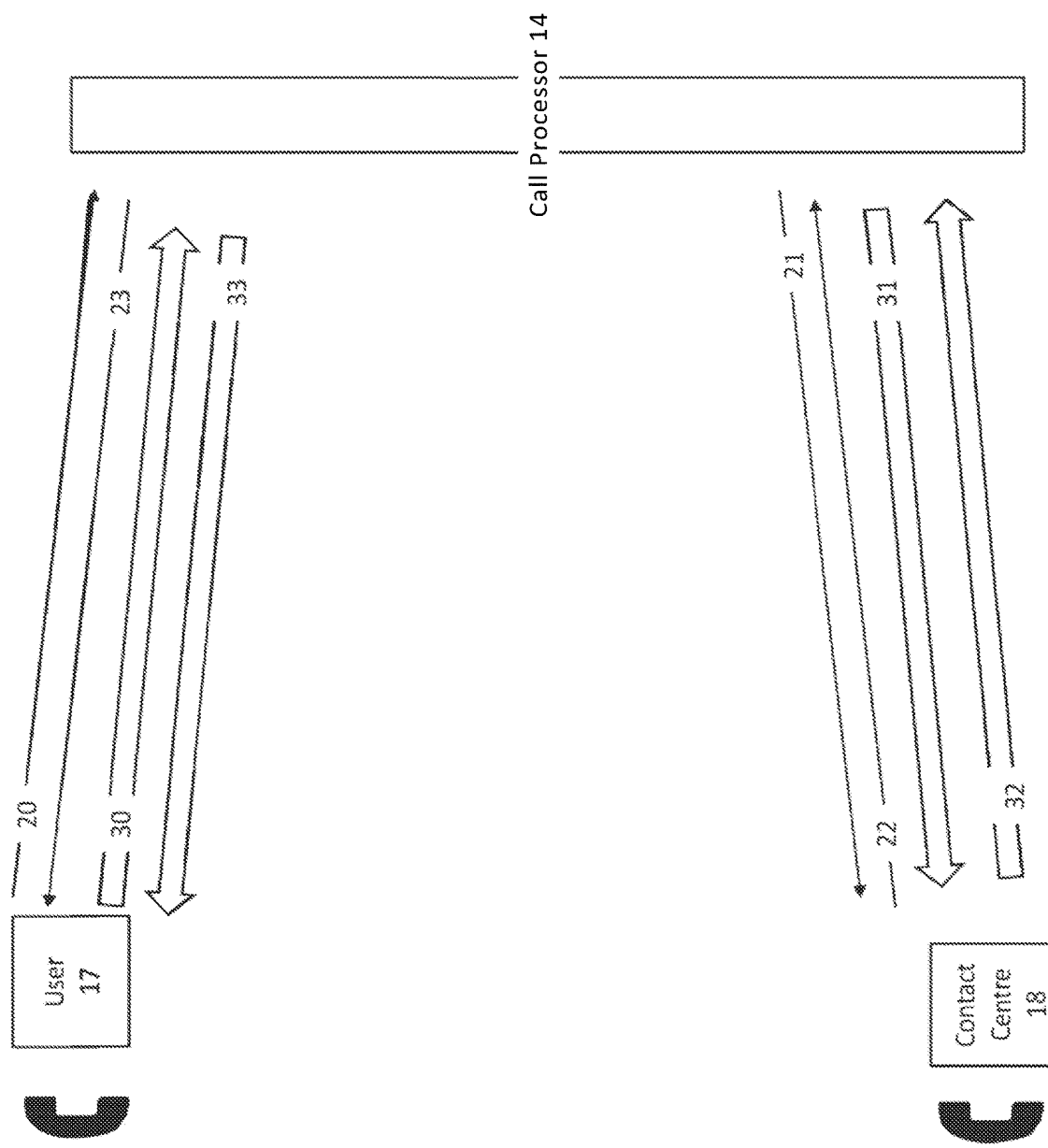
FIG. 3 is a simplified illustration of call paths showing a call conferenced with the call processor.

The call processor 14 then initiates a conference call with the user 17 and the contact centre 18. FIG. 3 is a simplified illustration of the resultant signalling and media streams.

A third VoIP media stream 30 is created between the user 17 and the call processor 14. VoIP data is transmitted over the third VoIP media stream 30 to the call processor 14. The call processor 14 creates a fourth VoIP media stream 31 and forwards VoIP data received from the user 17 via the VoIP third media stream 30 to the contact centre 18 over the VoIP fourth media stream 31.

This will enable the call processor to modify VoIP data received from the user, for example by removing DTMF tones or spoken sensitive information before forwarding the media to the contact centre 18.

Figure 4:
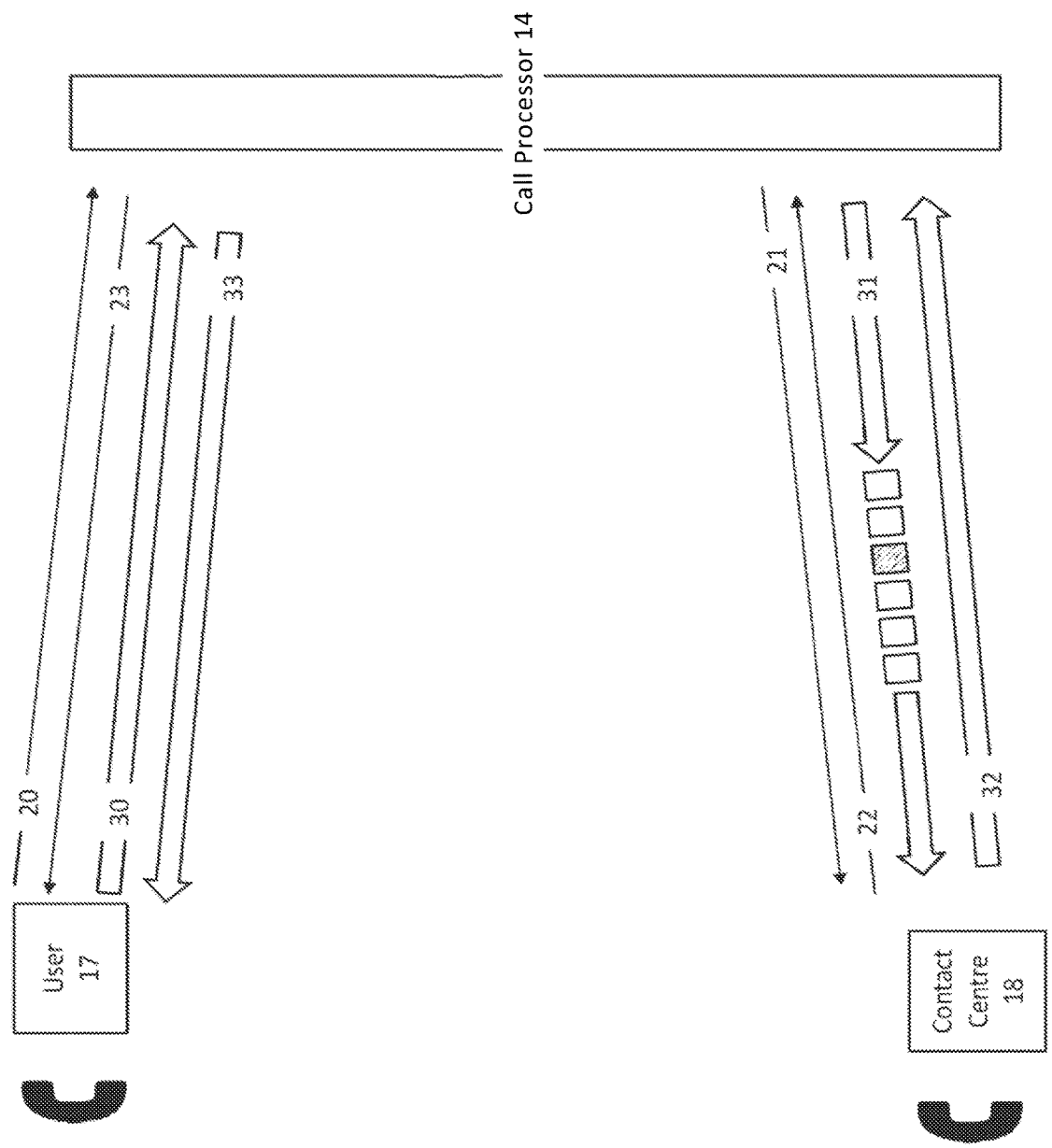
FIG. 4 is a simplified illustration of call paths showing removal of sensitive information from a media stream sent to a contact centre.

FIG. 4 shows schematically sensitive data being removed from the fourth media stream 31 before being forwarded to the contact centre 18.

A fifth VoIP media stream 32 is created between the contact centre 18 and the call processor 14. VoIP data is transmitted over the fifth VoIP media stream 32 to the call processor 14. The call processor 14 creates a sixth VoIP media stream 33 and forwards VoIP data received from the contact centre 18 via the VoIP fifth media stream 32 to the user 17 over the VoIP sixth media stream 33.

This will enable the call processor to modify VoIP data received from the contact centre 18, for example by removing DTMF tones or spoken sensitive information before forwarding the media to the user 17.

Figure 5:
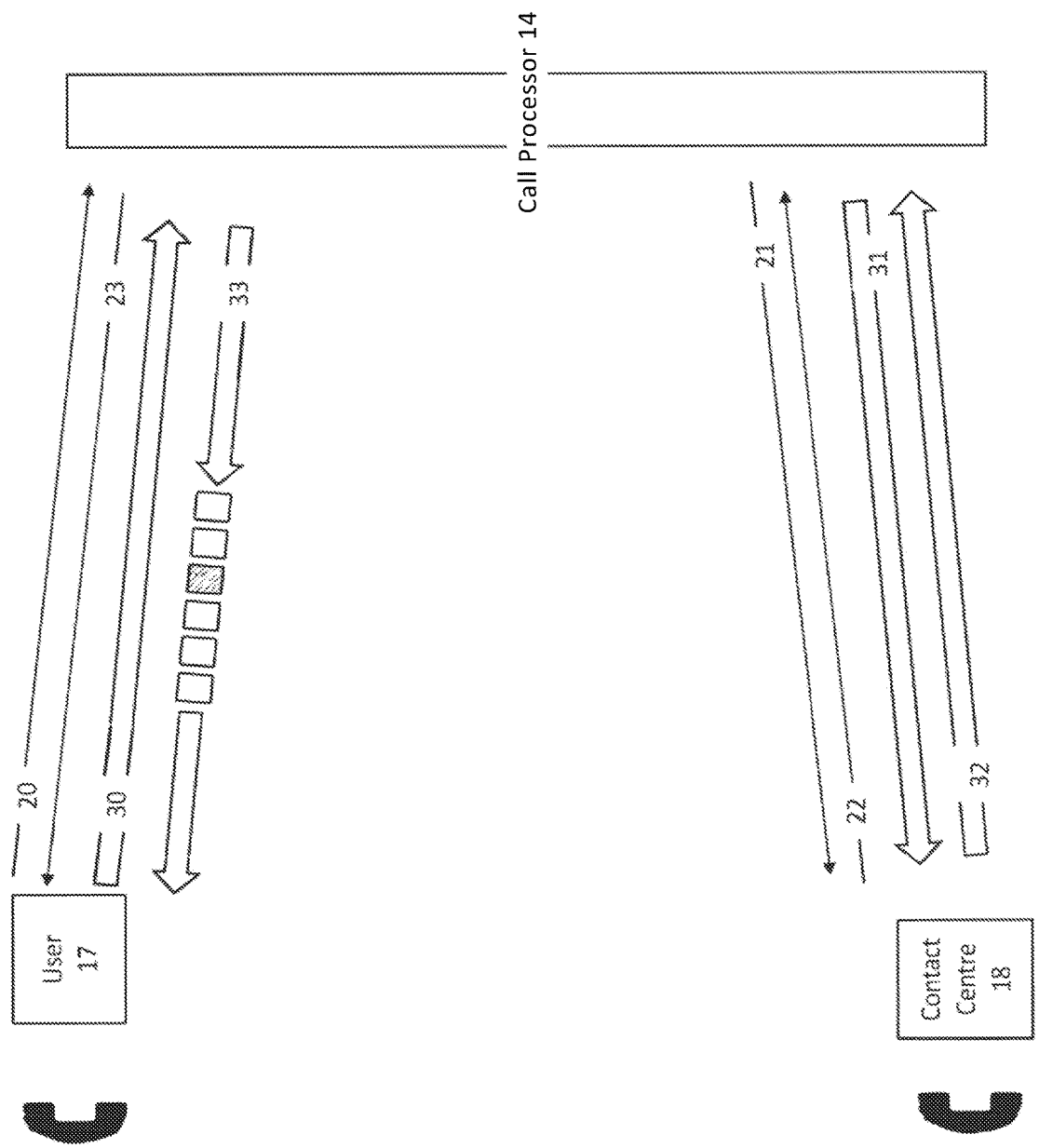
FIG. 5 is a simplified illustration of call paths showing removal of sensitive information from a media stream sent to a user.

FIG. 5 shows schematically sensitive data being removed from the sixth media stream 33 before being forwarded to the user 17.

The call processor 14 liaises with the secure data collection system 16 to obtain the required sensitive data from the user 17 and removes the sensitive data from the media that is forwarded to the contact centre 18, thus preventing the sensitive information from ever entering the contact centre 18.

The call processor 14 only needs to process the bandwidth required for the media call during the time that the call is in 'secure' mode. Once the sensitive data has been collected the media stream can be reconnected directly between the user 17 and the call centre 18 and the call processor 14 will drop out of the media stream.

The call is rerouted in a similar manner to previously:
1) re-INVITE (first call ID) is sent by the call processor 14 to the user 17
2) SIP OK (first call ID) is sent by the user to the call processor 14
3) re-INVITE (second call ID) is sent by the call processor 14 to the contact centre 18
4) SIP OK (second call ID) is sent by the contact centre 18 to the call processor 14.

The call paths revert to those shown in FIG. 2.

It will be appreciated that features of the invention which are, for brevity, described in the context of a single embodiment, may also be provided separately, or in another suitable combination.

It will be recognised that various alterations, modifications, and/or additions may be introduced into the constructions and arrangements of parts described above whilst remaining within the scope of the invention as claimed.

The invention claimed is:

1. A call processor for processing a Voice over Internet Protocol (VoIP) media call between a first entity and a second entity, the VoIP media call including separate signalling streams and media streams, and in which the media streams include first and second voice media streams over which media comprising audio information is transmitted between the first entity and the second entity without intervention by the call processor, the call processor embodied in computer hardware, the call processor configured to at least:
reroute the first and second voice media streams so that the VoIP media call is redirected via the call processor, including the call processor configured to:
(i) create a third media stream over which the media comprising audio information is to be transmitted from the first entity to the call processor, and a fourth media stream over which the media comprising audio information received by the call processor from the first entity via the third media stream is forwarded by the call processor to the second entity; and
(ii) create a fifth media stream over which the media comprising audio information is to be transmitted from the second entity to the call processor, and a sixth media stream over which the media comprising audio information received by the call processor from the second entity via the fifth media stream is forwarded by the call processor to the first entity; and
modify the media comprising audio information received from the first entity, including the call processor configured to remove sensitive audio information from the received audio information before the media comprising audio information is forwarded over the fourth media stream to the second entity.

2. The call processor of claim 1, wherein the call processor configured to remove the sensitive audio information includes the call processor configured to remove DTMF tones from the audio information before the media comprising audio information is forwarded over the fourth media stream.

3. The call processor of claim 1, wherein the call processor configured to remove the sensitive audio information includes removing spoken sensitive information from the audio information before the media comprising audio information is forwarded over the fourth media stream.

4. The call processor of claim 1, wherein the call processor is further configured to modify the media comprising audio information received from the second entity, including the call processor configured to remove sensitive audio information from the received audio information before the media comprising audio information is forwarded over the sixth media stream to the first entity.

5. The call processor of claim 4, wherein the call processor configured to remove the sensitive audio information includes the call processor configured to remove DTMF tones from the audio information before the media comprising audio information is forwarded over the sixth media stream.

6. The call processor of claim 4, wherein the call processor configured to remove the sensitive audio information includes the call processor configured to remove spoken sensitive information from the audio information before the media comprising audio information is forwarded over the sixth media stream.

7. The call processor of claim 1, wherein the call processor is further configured to receive a message from the second entity to reroute the first and second voice media streams, the call processor configured to reroute the first and second voice media streams responsive to the message.

8. The call processor of claim 1, wherein the second entity is a contact centre configured to send a message to a secure data collection server to indicate secure data collection is to be initiated on the VoIP media call, and receive a personal identification number from the secure data collection server, and
wherein the call processor is configured to reroute the first and second voice media streams based on the personal identification number.

9. The call processor of claim 1, wherein the call processor is further configured to redirect the VoIP media call between the first entity and the second entity, after the media comprising audio information is forwarded over the fourth media stream to the second entity, the VoIP media call as redirected being between the first entity and the second entity without intervention by the call processor.

10. The call processor of claim 9, wherein the call processor configured to redirect the VoIP media call includes recreation of the first and second voice media streams between the first entity and the second entity.

11. A method of processing, by a call processor, a Voice over Internet Protocol (VoIP) media call between a first entity and a second entity, the VoIP media call including separate signalling streams and media streams, and in which the media streams include first and second voice media streams over which media comprising audio information is transmitted between the first entity and the second entity without intervention by the call processor, the method comprising:
rerouting the first and second voice media streams so that the VoIP media call is redirected via the call processor, rerouting the first and second voice media streams including:
(i) creating a third media stream over which the media comprising audio information is to be transmitted from the first entity to the call processor, and a fourth media stream over which the media comprising audio information received by the call processor from the first entity via the third media stream is forwarded by the call processor to the second entity; and
(ii) creating a fifth media stream over which the media comprising audio information is to be transmitted from the second entity to the call processor, and a sixth media stream over which the media comprising audio information received by the call processor from the second entity via the fifth media stream is forwarded by the call processor to the first entity; and
using the call processor to modify the media comprising audio information received from the first entity, including the call processor removing sensitive audio information from the received audio information before the media comprising audio information is forwarded over the fourth media stream to the second entity.

12. The method of claim 11, wherein removing the sensitive audio information includes removing DTMF tones from the audio information before the media comprising audio information is forwarded over the fourth media stream.

13. The method of claim 11, wherein removing the sensitive audio information includes removing spoken sensitive information from the audio information before the media comprising audio information is forwarded over the fourth media stream.

14. The method of claim 11, wherein the method further comprises using the call processor to modify the media comprising audio information received from the second entity, including the call processor removing sensitive audio information from the received audio information before the media comprising audio information is forwarded over the sixth media stream to the first entity.

15. The method of claim 14, wherein removing the sensitive audio information includes removing DTMF tones from the audio information before the media comprising audio information is forwarded over the sixth media stream.

16. The method of claim 14, wherein removing the sensitive audio information includes removing spoken sensitive information from the audio information before the media comprising audio information is forwarded over the sixth media stream.

17. The method of claim 11, wherein the method further comprises the call processor receiving a message from the second entity to reroute the first and second voice media streams, and the first and second voice media streams are rerouted responsive to the message.

18. The method of claim 11, wherein the second entity is a contact centre that sends a message to a secure data collection server to indicate secure data collection is to be initiated on the VoIP media call, and receives a personal identification number from the secure data collection server, and
wherein the first and second voice media streams are rerouted based on the personal identification number.

19. The method of claim 11, wherein the method further comprises redirecting the VoIP media call between the first entity and the second entity, after the media comprising audio information is forwarded over the fourth media stream to the second entity, the VoIP media call as redirected being between the first entity and the second entity without intervention by the call processor.

20. The method of claim 19, wherein redirecting the VoIP media call includes recreating the first and second voice media streams between the first entity and the second entity.

* * * * *